(12) United States Patent
Jacobs

(10) Patent No.: US 11,784,338 B2
(45) Date of Patent: Oct. 10, 2023

(54) INTEGRATED SOLAR HYDROGEN PRODUCTION MODULE

(71) Applicant: Woodside Energy Technologies Pty Ltd, Perth (AU)

(72) Inventor: Lourens Jacobs, Perth (AU)

(73) Assignee: WOODSIDE ENERGY TECHNOLOGIES PTY LTD, Western Australia (AU)

( * ) Notice: Subject to any disclaimer, the term of this patent is extended or adjusted under 35 U.S.C. 154(b) by 0 days.

(21) Appl. No.: 18/163,011

(22) Filed: Feb. 1, 2023

(65) Prior Publication Data

US 2023/0178783 A1 Jun. 8, 2023

Related U.S. Application Data

(63) Continuation of application No. PCT/AU2021/050867, filed on Aug. 6, 2021.

(30) Foreign Application Priority Data

Aug. 6, 2020 (AU) .................................. 2020902775

(51) Int. Cl.
*H02S 40/38* (2014.01)
*H01M 8/18* (2006.01)

(52) U.S. Cl.
CPC ........... *H01M 8/186* (2013.01); *H01M 8/188* (2013.01); *H02S 40/38* (2014.12)

(58) Field of Classification Search
CPC ........ H01M 8/186; H01M 8/188; H02S 40/38
See application file for complete search history.

(56) References Cited

U.S. PATENT DOCUMENTS

2006/0137348 A1 6/2006 Pas
2017/0233055 A1* 8/2017 Brutoco .................. H02S 20/30
244/30

FOREIGN PATENT DOCUMENTS

CN 109606174 A 4/2019
CN 210596280 U 5/2020

OTHER PUBLICATIONS

International Search Report and Written Opinion in counterpart International Application No. PCT/US2021/050867, dated Sep. 30, 2021, 13 pages.

(Continued)

*Primary Examiner* — Brian R Ohara
*Assistant Examiner* — Brent C Thomas
(74) *Attorney, Agent, or Firm* — Edell, Shapiro & Finnan, LLC

(57) ABSTRACT

An integrated solar hydrogen production module includes a plurality of PV cells supported on a housing of the module. The module has an energy storage system which includes a rechargeable metal ion battery and a flow battery. The metal ion battery is charged by the PV cells. An electrolyser for converting water to gaseous hydrogen and oxygen can be powered directly by the PV cells or by either of the rechargeable metal ion battery and a flow battery. The PV cells, the metal-ion battery, the flow battery membrane and the electrolyser are electrically coupled together and integrated into or carried by the module housing. Electrically powered and solar thermal heaters can be incorporated into or with the module to heat the water in the electrolysers. A pump pressurises the water to facilitate the pressurisation of hydrogen and oxygen produced by the electrolysis.

24 Claims, 2 Drawing Sheets

(56) References Cited

OTHER PUBLICATIONS

International Preliminary Report on Patentability and Written Opinion in counterpart International Application No. PCT/US2021/050867, dated Jun. 30, 2022, 41 pages.

* cited by examiner

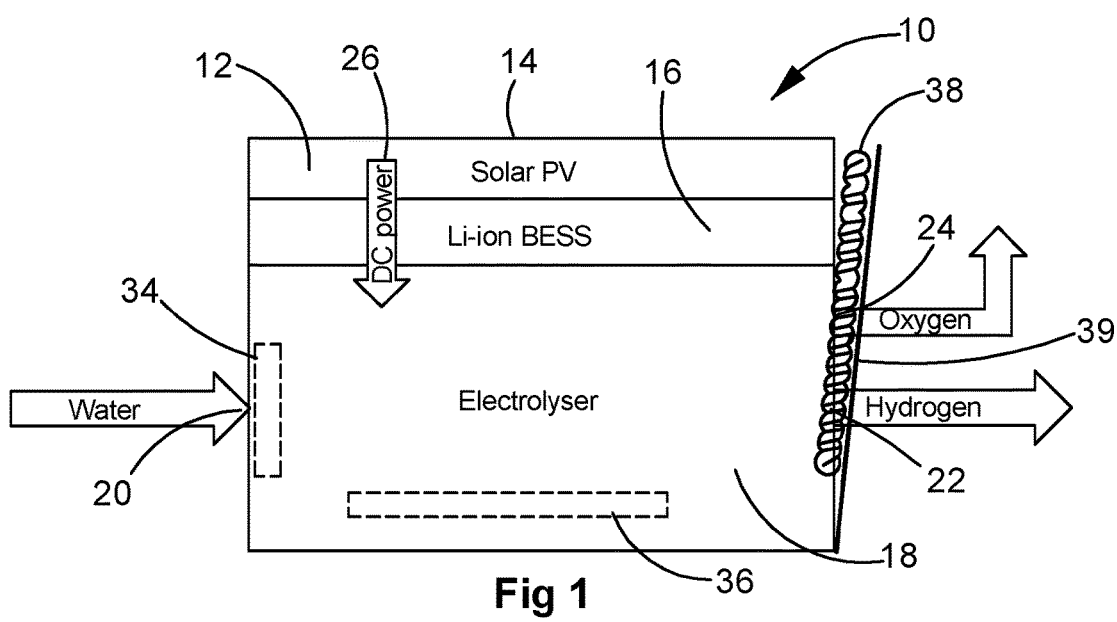
Fig 1
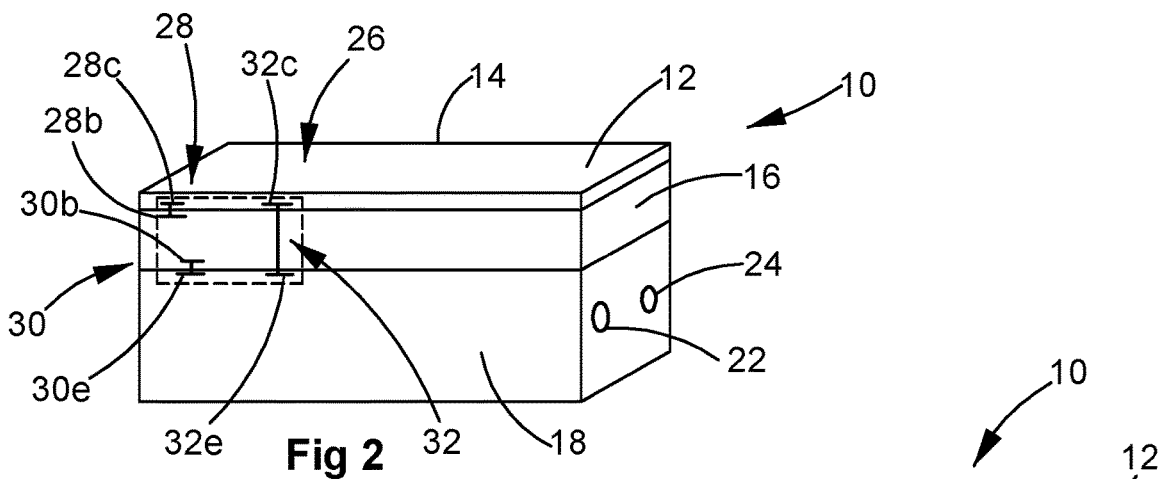
Fig 2
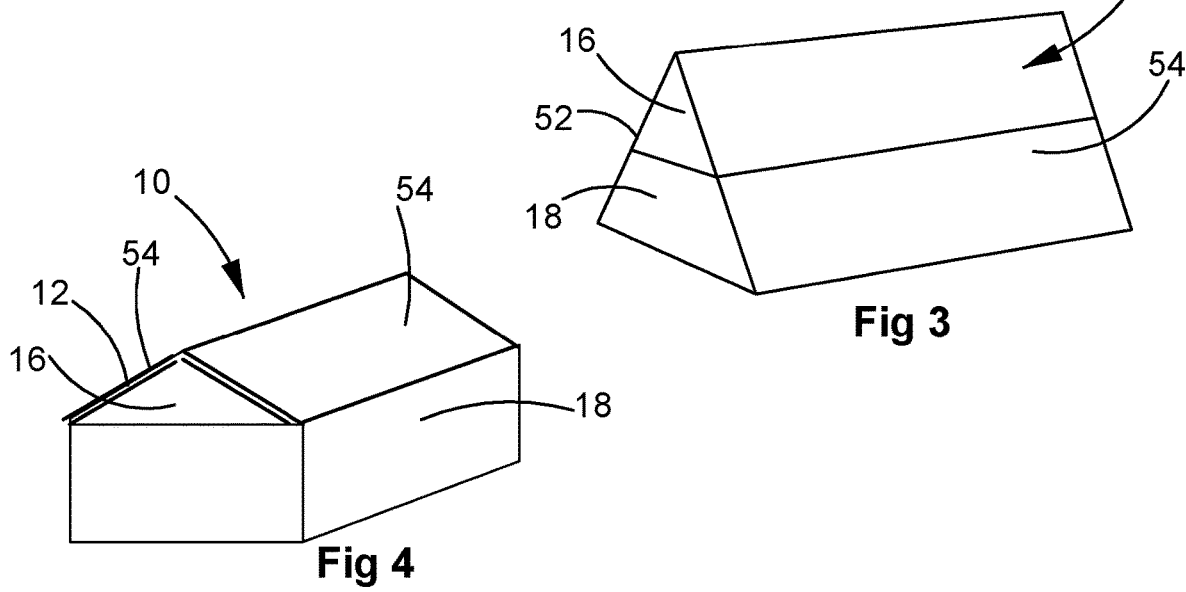
Fig 3
Fig 4

INTEGRATED SOLAR HYDROGEN PRODUCTION MODULE

CROSS-REFERENCE TO RELATED APPLICATIONS

This application is a continuation of International Application No. PCT/AU2021/050867, filed Aug. 6, 2021, which claims priority from Australian Patent Application No. 2020902775, filed Aug. 6, 2020, the entire disclosures of which are incorporated herein by reference.

TECHNICAL FIELD

An integrated solar hydrogen production module is disclosed.

BACKGROUND

To date hydrogen is predominantly produced from fossil fuel by: steam reforming of natural gas; coal gasification; or, partial oxidation of methane. However, this results in carbon emissions. Electrolysis is also used to produce hydrogen, but only on a small scale. This needs the input of electrical power. When the electrical power is derived from a renewable energy source no carbon is produced and the hydrogen is known as green hydrogen. Although, a carbon footprint does exist in relation to the manufacture of the components and plant need to perform the electrolysis as well as the transport of hydrogen to a processing or consumption location.

It would be desirable for there to be an economical and easily scalable apparatus or way of producing green hydrogen.

The above references to the background art do not constitute an admission that the art forms a part of the common general knowledge of a person of ordinary skill in the art.

SUMMARY

In broad and general terms, the idea or concept behind the present disclosure is to provide a module for producing green hydrogen that is self-contained. The module utilises renewable energy as a source of electrical power to drive an electrolyser. The electrolyser may be arranged to produce separate gaseous hydrogen and oxygen streams, or a mixed gas stream of hydrogen and oxygen. In the case of the production of separate streams, the oxygen may be vented to atmosphere or conducted to a separate location for processing and/or storage. In the case of a mixed hydrogen and oxygen gas stream an oxygen absorption material system can be used to absorb oxygen from the mixed stream and allow a downstream flow of hydrogen only.

Due to the utilisation of renewable energy as the power source, embodiments of the disclosed module naturally do not need connection to an external power source to produce the hydrogen. A battery energy storage system is incorporated as part of the module to store electrical power from the renewable energy source. This may enable power to be provided to an internal electrolyser 24 hours a day subject only to the renewable energy source providing sufficient electrical power over a given time period to sustain the level of charge in the battery energy storage system. Alternately the stored power may be used to facilitate a zero turn down state where a minimum potential difference (e.g. 1.49V) is maintained between electrodes of the electrolyser with no current flow.

In a first aspect there is disclosed an integrated solar hydrogen production module comprising:
one or more photovoltaic cells supported on, or forming at least a portion of, a housing of the module;
an energy storage system comprising a rechargeable metal ion battery and a flow battery having a membrane; and
an electrolyser for converting water to gaseous hydrogen and oxygen; and
wherein the photovoltaic cells are arranged to at least provide charge to the metal-ion battery, and the flow battery is arranged to provide electricity: directly to the electrolyser; or indirectly to the electrolyser via the rechargeable metal ion battery.

In one embodiment the module comprises an integrated module DC power connection system enabling DC power generated by the one or more photovoltaic cells to be transferred directly or indirectly to the electrolyser.

In one embodiment the module DC power connection system comprises: cell to battery connectors arranged to enable a direct flow of power from the one or more photovoltaic cells to the battery; and, battery to electrolyser connectors enabling a direct flow of power from the battery to the electrolyser.

In one embodiment the module DC power connection system comprises cell to electrolyser connectors arranged to enable a flow of power from the one or more photovoltaic cells directly to the electrolyser.

In one embodiment the DC power connection system is capable of monitoring a power storage level of the battery and is operable to cause a direct flow of power from the one or more photovoltaic cells to the electrolyser when the power storage level is above a threshold level.

In one embodiment the cell to battery connectors comprise cell connectors formed on the one or more photovoltaic cells and battery connectors formed on the battery energy storage system and wherein the cell connectors are in electrical connection with the battery connectors when the cells and battery are integrated into the single module.

In one embodiment the battery to electrolyser electrical connectors comprise battery connectors formed on the battery and electrolyser connectors formed on the electrolyser and wherein the battery connectors are in electrical connection with the electrolyser connectors when the battery and the electrolyser are integrated into the single module.

In one embodiment the cell to electrolyser electrical connectors comprise battery connectors formed on the battery and electrolyser connectors formed on the electrolyser and wherein the battery connectors are in electrical connection with the electrolyser connectors when the battery and the electrolyser are integrated into the single module.

In one embodiment the module comprises a solar thermal heater arranged to heat water held in or flowing into the electrolyser.

In one embodiment the module comprises an electric heater powered by the one or more photovoltaic cells or the energy storage system and arranged to heat water held in or flowing into the electrolyser.

In one embodiment the module comprises a pump arranged to pressurise water in the electrolyser.

In one embodiment the pump is arranged to pressurise the water to produce gaseous hydrogen at a pressure greater than 2 barg.

In one embodiment the pump is arranged to pressurise the water to produce gaseous hydrogen at a pressure greater than 10 barg.

In one embodiment the pump is arranged to pressurise the water to produce gaseous hydrogen at a pressure in the order of 40 barg.

In one embodiment the energy storage system is configured to provide a maximum output voltage of less than 100 VDC.

In one embodiment the energy storage system is configured to provide a maximum output voltage of no more than 50 VDC.

In one embodiment the one or more photovoltaic cells cover a surface area equal to at least 10% of the total surface area of the module.

In one embodiment the module is in the configuration of a rectangular prism having a top surface, four side surfaces and a bottom surface and wherein the one or more photovoltaic cells cover at least 50% of the top surface.

In one embodiment the module is in the configuration of a rectangular prism having a top surface, four side surfaces and a bottom surface and wherein the one or more photovoltaic cells covers a portion of at least the top surface and a portion of at least one of the four side surfaces.

In one embodiment the module comprises one or more pitched surfaces and the one or more photovoltaic cells cover at least a portion of at least one of the pitched surfaces.

In one embodiment the electrolyser is formed without a membrane or separator and wherein hydrogen and oxygen produced by the electrolyser exits as a mixture of hydrogen and oxygen.

In one embodiment the module comprises an oxygen absorption material or system arranged to receive the mixture of hydrogen and oxygen external of the electrolyser wherein oxygen in the mixture is absorbed by the material system while hydrogen is able to flow downstream of the material or system.

In one embodiment the flow battery and the electrolyser both use a common electrolyte.

In one embodiment the common electrolyte is an alkaline.

In one embodiment the module comprises an electrolyte handling system arrange to provide the common electrolyte to the flow battery and the electrolyser.

In one embodiment the flow battery comprises first and second circuits for circulating respective liquids across the membrane, each circuit having a storage tank for the liquid and a pump; and wherein the first and second circuits are held within the module housing.

In one embodiment the photovoltaic cells, the metal-ion battery, the flow battery and the electrolyser are separate sub-modules, wherein the respective electrical connectors are arranged to automatically electrically couple together when the sub-modules are integrated together to form the module.

In a second aspect there is disclosed a solar hydrogen production module comprising:

one or more photovoltaic cells supported on, or forming at least a portion of, an outer surface of the module;

an energy storage system;

an electrolyser for converting water to gaseous hydrogen and oxygen and producing a mixed gas stream of hydrogen and oxygen that exits the electrolyser; and an oxygen absorption material or system to which the mixed gas stream is fed, the oxygen absorption material or system arranged to absorb oxygen from the mixture and allow a downstream flow of gases hydrogen.

In a third aspect there is disclosed an integrated solar hydrogen production module comprising:

one or more photovoltaic cells supported on or forming at least a portion of an outer surface of a housing of the module;

a battery energy storage system; and an electrolyser for converting water to gaseous hydrogen and oxygen; wherein the one or more photovoltaic cells, battery energy storage system and electrolyser are formed as separate sub-modules and arranged to be automatically electrically coupled together when the sub modules are integrated into and form the module.

BRIEF DESCRIPTION OF THE DRAWINGS

Notwithstanding any other forms which may fall within the scope of the Module as set forth in the Summary, specific embodiments will now be described, by way of example only, with reference to becoming drawings in which:

FIG. 1 is a schematic representation of one embodiment of the disclosed integrated solar hydrogen production module;

FIG. 2 is a further schematic representation of the embodiment of the module shown in FIG. 1;

FIG. 3 is a schematic representation of a second embodiment of the integrated solar hydrogen production module;

FIG. 4 is a schematic representation of a third embodiment of the integrated solar hydrogen production module.

DETAILED DESCRIPTION

Figure 5:
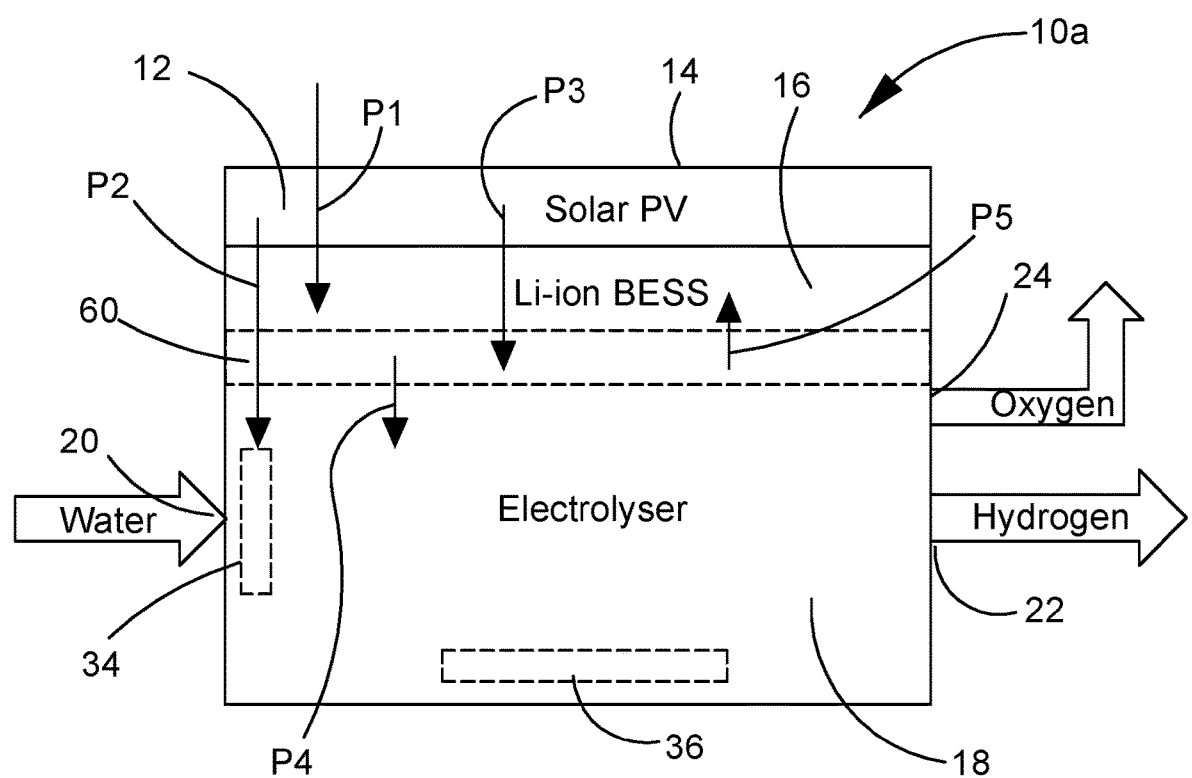
FIG. 5 is a schematic representation of fourth embodiment of the integrated solar hydrogen production module.

With reference to the drawings an embodiment of the disclosed integrated solar hydrogen production module 10 comprises one or more renewable energy transducers 12 supported on, or forming at least a portion of, a housing of the module 10; an energy storage system (hereinafter "battery") 16; and an electrolyser 18 for converting water to gaseous hydrogen and oxygen. The transducers 12 may be supported on an outer surface 14 of the module housing. The transducers 12, battery 16 and electrolyser 18 are electrically coupled together and integrated into a single module. In this, but not necessarily all, embodiments of the transducers 12 comprise one or more photovoltaic cells 12.

By virtue of the renewable energy transducers/cells 12, the module 10 does not require connection to any external power source. However, the module 10 includes an inlet 20 for receiving water, a gaseous hydrogen outlet 22, and a gaseous oxygen outlet 24. The hydrogen outlet 22 may be coupled to a pipe or manifold for conducting the gaseous hydrogen to a downstream processing or storage facility. The oxygen outlet 24 may be vented to atmosphere or coupled to a pipe or manifold for conducting to a downstream oxygen processing or storage facility. In a further variation the electrolyser 18 may be membrane-less, or otherwise provided with no internal separator for the produced hydrogen and oxygen in which case both gases may be conducted as a mixed gas via a common conduit. In this variation the mixed gas may be passed through an oxygen absorption material/system which absorbs the gaseous oxygen but allows the gaseous hydrogen to pass through. The absorbed oxygen can be stored or transported to a processing facility where it can be extracted and utilised to derive commercial benefit or gain.

Water for the electrolyser 18 may be provided by a pipe or reticulation system coupled to the inlet 20. The water may be derived from a scheme or bore system, and/or from storage tanks (not shown) located near the module 10. In the illustrated embodiment the electrolyser 18 may be one provided with a membrane/separator between a corresponding anode and cathode or formed without a membrane or separator. The former enables separate hydrogen and oxygen streams to exit from the electrolyser through the outlets 22 and 24 respectively in separate conduits. However, in the alternate embodiment where there is no membrane or separator, the electrolyser 18 is formed with a single outlet carrying a mixture of hydrogen and oxygen. Also, the electrolyser 18 may use either an alkaline or acidic electrolyte.

The module 10 is formed with an integrated module DC power connection system 26 enabling DC power generated by the one or more photovoltaic cells 12 to be transferred directly or indirectly to the electrolyser 18. The module DC power connection system 26 includes multiple sets of connectors including:

cell to battery connectors 28 arranged to enable a direct flow of power from the one or more photovoltaic cells to the battery;

battery to electrolyser connectors 30 enabling a direct flow of power from the battery to the electrolyser; and cell to electrolyser connectors 32 arranged to enable a direct flow of power from the one or more photovoltaic cells directly to the electrolyser (i.e. bypassing the battery 16)

The DC power connection system 26 may also incorporate a processor, software and associated switches and sensors to enable a range of functionality. At a basic level this may include the capability to monitor the power or charge level of the battery and provide switching functionality. For example, the system 26 may be operable to cause a direct flow of power from the one or more photovoltaic cells 12 to the electrolyser 18 when the power stored in the battery is above a threshold level. This may be used for example where the battery 16 is fully charged and the rate of producing electricity by the cells 12 exceeds the rate of consumption of power from the battery 12 by the electrolyser 18. In this instance the system 26 may operate to open switches (not shown) between the cell to battery connectors 28, and the battery to electrolyser connectors 30 and close a switch between the cell to electrolyser connectors 32 so that power from the solar cells 12 powers the electrolyser 18 directly, with no electrical power being provided by the cells 12 to the battery 16, or from the battery 16 to the electrolyser 18.

Alternately the system 26 may close all switches so that the cells 12 provide electrical power in parallel to both the battery 16 and the electrolyser 18, with the electrolyser also receiving electrical energy from the battery 16. A further operational scenario is that the system 26 closes the switches for the connectors 28 and 32 but opens the switch for connectors 30 so that the cells 12 provide operational power directly to the electrolyser 18 and also provides a charge to the battery 16 to maintain stored charge at a maximum threshold level.

The processor and software if incorporated in the system 26 may be arranged or programmed to continuously monitor operating conditions including for example power output from the PV cells 12, charge level of the battery 16, power consumption of the electrolyser 18, pressure and temperature of the water and electrolyte within the electrolyser 18, time of day, position and orientation of the PV cells 12. The processor in the system 26 may also receive sun position data, sunset and sunrise times via an inbuilt communication system. With this information the system 26 can be operated to control the module 10 to maximise hydrogen production utilising either pre-programmed or transmitted software, data and algorithms.

If the module 10 includes additional equipment such as a pump 34 or a heater 36 (discussed later in this specification) the system 26 may be provided with corresponding switching functionality to enable one or both of the pump 34 and heater 36 to be powered directly via the PV cells 12 or via the battery 16.

The cells 12, battery 16 and electrolyser 18 are made as separate components or sub-modules but integrated into the module 10 as a single sealed unit. The electrical connectors 28, 30, 32 are formed in their respective components/sub-modules and arranged so that the connectors are placed in electrical connection automatically when the sub-modules are integrated into the module 10. For example, the cell to battery connectors 28 comprise cell connectors 28$c$ formed in, with or on the cells 12 and battery connectors 28$b$ formed in, with or on the battery 16. The connectors 28$c$ and 28$b$ are disposed so that when the cells 12 are integrated with the battery 16 into the module 10 the connectors 28$c$ and 28$b$ are in electrical contact.

Likewise, the battery to electrolyser connectors 30 may include battery connectors 30$b$ formed in, with, or on the battery 16 and electrolyser connectors 30$e$ formed in, on or with the electrolyser 18. The connectors 30$b$ and 30$e$ are disposed so when the battery 16 is integrated with the electrolyser 18 into the module 10 the connectors 30$b$ and 30$e$ are in electrical contact.

The cell to electrolyser connectors 32 may include cell connectors 32$c$ formed in, with all on the cells 12, and electrolyser connectors 32$e$ formed in, on or with the electrolyser 18. The connectors 32$b$ and 32$e$ are disposed so that when the cells 12 is integrated with the battery 16 and the electrolyser 18 integrated into the module 10, the connectors 32$c$ and 32$e$ are in electrical contact.

The connectors 28$b$, 28$c$, 30$b$, 30$e$, 32$c$, 32$e$ are positioned and arranged on their respective sub-modules so that when the sub-modules are brought together form the module 10 these connectors automatically connect together. In one example at least one of each pair of the connectors maybe spring-loaded to contact with the other connector of the pair. Alternately the respective pairs of connectors may be in the form of plugs and sockets which are located to inter-fit with each other when the sub modules are connected together to form the module 10.

As discussed above, the module 10 may be provided with an electrically powered heater 36 for heating the water in the electrolyser 18. The heater 36 may be internal of the electrolyser 18. Alternately the heater 36 may be provided in a water storage tank which is coupled to the inlet 20. Alternately or additionally a solar thermal water heater 38 may be provided on the module 10 or otherwise formed on panels 39 (only one shown in FIG. 1) that are integral with the module 10. The panels 39 may form side walls that are hinged to a portion of housing of the module 10 and fold down to lay on the ground and face the sky when the module 10 is installed and ready for use. The water heater 36 and/or 38 may heat the water to a temperature of ≥60° C., or ≥80° C. When both an internal heater 36 and solar thermal water heater 38 are provided, a controller may be programmed to activate the heater 36 when the temperature of water heated by the solar thermal water heater 38 is less than a threshold level.

As previously mentioned, the module 10 may include a pump 34 for pressurising the water within the electrolyser 18. The idea here is to ensure that the hydrogen at the outlet 22 is provided with a sufficient head of pressure to flow without the aid of compressors to a downstream processing or storage facility. The water pressure may be adjusted by the pump 34 so that the hydrogen at the outlet 22 is at a pressure of at least 2 barg, or at least 10 barg, or in the order of 40 barg. This requires the water at the inlet 20 or within the electrolyser to be pressurised to substantially the same pressure.

Each of the pump 34 and heater 36 may be electrically powered by connection with the battery 16 and/or the cells (or other renewable energy source) 12. As with all the previously described electrical connections, the connections between the pump 34 and heater 36; and the battery 16 and/or cells 12 may be formed in, with or on the respective components so that the electrical connections are automatically made upon integration of the respective components into the module 10.

In the embodiment shown in FIGS. 1 and 2 the module 10 is shown in the form of a rectangular prism having a top 40, bottom wall 42, and four side walls, 44, 46, 48 and 50. When the renewable energy source comprises PV cells 12, the cells 12 may occupy at least 10% of the total surface area of the module 10. With the illustrated rectangular prism configuration, the cells 12 may cover at least 50% of the top surface 42. However, the cells 12 are not limited to being located on the top surface 42. They may also occupy at least a portion of the area of one or more of the side surfaces 44, 46, 48 and 50.

FIG. 3 shows an alternate configuration of the module 10 as a triangular prism having two pitched surfaces 52 and 54. FIG. 4 shows a further alternate configuration of module 10 as a right angle pentagonal prism, also with pitched surfaces 52 and 54. When the renewable energy source is in the form of PV cells 12, the module 10 can be provided with at least one of the pitched surface for supporting the cells 12 to enhance the angle of incidence and exposure time to the sun.

A plurality of sensors, either wireless, wired or both may be embedded in various components of the module 10 and provide information to one or both of an on-board controller or an external control centre to enable monitoring of the performance and output of the module 10 and provide a degree of control of various components. The sensors may include for example temperature and charge level sensors in the battery 16; water pressure and water temperature sensors in the electrolyser 18, water flow rate into the inlet 20; hydrogen temperature and/or pressure and/or flow rate sensors at the outlet 22;

oxygen temperature and/or pressure and/or flow rate sensors at the outlet 24; current draw sensors for the pump 34 and heater 36; electrolyte concentration and/or density of the electrolyser 18.

The battery energy storage system 16 may comprise a bank of rechargeable metal ion batteries such as but not limited to Li-ion batteries. The maximum voltage output from the renewable energy source/cells 12 and the battery 16 may be limited to less than 100 VDC, or less than 50 VDC. Both are characterised as "low-voltage" thereby enabling electrical connection to be made without the use of qualified electricians.

In some embodiments the renewable energy source 12 comprises wind turbines mounted on the module 10, either as an alternative to or in combination with the previously disclosed PV cells. The PV cells may take any suitable form including thin film cells. When PV cells 12 are used in the module 10 they may be: (a) mounted on a platform coupled to one or more motors and provided with an ability to track the sun; or (b) mounted as, or on panels that can be unfolded and/or swung out from one or more surfaces or edges of the system 10.

In addition to a rechargeable battery such as a lithium-ion battery shown in FIG. 1, an embodiment of the integrated solar hydrogen production module may also comprise a redox flow battery 60 as shown in the module 10a depicted in FIG. 5. The flow battery 60 produces electricity by pumping respective first and second liquids, each comprising an electrolyte with one or more dissolved electroactive elements, to flow on opposites sides of a membrane. An exchange of ions occurs across the membrane producing an electron flow as the electrolytes circulate in separate first and second circuits. Each circuit includes: a storage tank for the respective liquid; and, a pump.

In the module 10a the flow battery may be wholly or at least partially within the housing of the module 10a. An example of a partial incorporation of the flow battery 60 is where the membrane, liquid flow paths across the membrane and electrical output conductors are within the housing of the module; and the liquid storage tanks and associated pumps located outside of the module housing. The flow battery pumps may be powered by the PV cells 14, which also charge the Li-ion battery. Electricity produced by the flow battery 60 may be used (a) during the day to drive the electrolyser 18, saving the charge in the Li-ion battery to drive the electrolyser 18, or (b) to drive the flow battery pumps during the night. In another variation the flow battery 60 may be used during the day (i.e., when sufficient solar energy is available to drive the flow battery pumps) to charge the Li-ion battery 16 (in addition to the charging provided by the PV cells 14). In this variation the battery 16 then drives the electrolyser 18, with optionally electricity also being provided by the PV cells 14 and/or the flow battery 60.

The possible power flows between various components of the system 10a representative in FIG. 5 as follows:

P1 power from the solar cells 12 is delivered to the battery 16;

P2 power from the solar cells 12 directly powers the electrolyser 18;

P3 power from the solar cells 12 is used to drive the pumps of the flow battery 60;

P4 power from the flow battery 60 is used to directly drive the electrolyser 18; and P5 power from the flow battery 60 is used to charge the battery 16 and thus indirectly power the electrolyser 12.

Additional sensors are provided for acquiring information on the flow battery 60 operation and performance characteristics. This information is sent to the on-board controller or external control centre. These in turn are arranged to optimise electrical power use and flow between the PV cells 14, metal ion battery 16, flow battery 60 and the electrolyser 18 to maximise hydrogen generation having regard to instantaneous system and environmental conditions. This may also be augmented by the provision of forecast weather conditions to the controller.

The electrolyte used in the electrolyser 18 and the electrolyser used in the flow battery 60 may be the same. This enables a single common electrolyte top-up or handling system to be used to top up the electrolyte in the electrolyser 18 and flow battery 60. One example of a common electrolyte that may be supplied to both the electrolyser 18 and the flow battery 60 is potassium hydroxide (KOH), i.e., the electrolyser 18 uses an alkaline electrolyte.

This embodiment of the module 10a may also incorporate the pump 34 and heater 36 described in relation to the module 10 shown in FIG. 1.

While several exemplary embodiments have been presented in the foregoing detailed description, it should be appreciated that a vast number of variations exist. For example, the energy storage system 16 may comprise forms of rechargeable batteries other than metal-ion batteries. It should also be appreciated that the exemplary embodiments of the module are only examples, and are not intended to limit the scope, applicability, or configuration of the present disclosure in any way. Rather, the foregoing detailed description will provide those skilled in the art with a convenient road map for implementing an exemplary embodiment of the disclosed module.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the system and method as disclosed herein.

What is claimed:

1. An integrated solar hydrogen production module comprising:
   one or more photovoltaic cells supported on, or forming at least a portion of, a housing of the module;
   an energy storage system comprising a rechargeable metal-ion battery and a flow battery having a membrane; and
   an electrolyser for converting water to gaseous hydrogen and oxygen;
   wherein the photovoltaic cells are arranged to at least provide charge to the metal-ion battery, and the flow battery is arranged to provide electricity: directly to the electrolyser; or indirectly to the electrolyser via the rechargeable metal-ion battery.

2. The integrated solar hydrogen production module of claim 1, further comprising an integrated module DC power connection system enabling DC power generated by the one or more photovoltaic cells to be transferred directly or indirectly to the electrolyser.

3. The integrated solar hydrogen production module of claim 2, wherein the module DC power connection system comprises:
   cell to battery connectors arranged to enable a direct flow of power from the one or more photovoltaic cells to the metal ion battery; and
   battery to electrolyser connectors enabling a direct flow of power from the metal ion battery to the electrolyser.

4. The integrated solar hydrogen production system of claim 3, wherein the cell to battery connectors comprise cell connectors formed on the one or more photovoltaic cells and battery connectors formed on the metal-ion battery and wherein the cell connectors are in electrical connection with the battery connectors when the cells and metal ion battery are integrated into the module.

5. The integrated solar hydrogen production module of claim 3, wherein the battery to electrolyser electrical connectors comprise battery connectors formed on the metal ion battery and electrolyser connectors formed on the electrolyser and wherein the battery connectors are in electrical connection with the electrolyser connectors when the battery and the electrolyser are integrated into the module.

6. The integrated solar hydrogen production module of claim 3, wherein the cell to electrolyser electrical connectors comprise battery connectors formed on the battery and electrolyser connectors formed on the electrolyser and wherein the battery connectors are in electrical connection with the electrolyser connectors when the battery and the electrolyser are integrated into the module.

7. The integrated solar hydrogen production module of claim 3, wherein the photovoltaic cells, the metal-ion battery, the flow battery and the electrolyser are formed as separate sub-modules wherein the respective electrical connectors are arranged to automatically electrically coupled together when the sub-modules are integrated together to form the module.

8. The integrated solar hydrogen production module of claim 2, wherein the module DC power connection system comprises cell to electrolyser connectors arranged to enable a flow of power from the one or more photovoltaic cells directly to the electrolyser.

9. The integrated solar hydrogen production system of claim 8, wherein the module DC power connection system is capable of monitoring a power storage level of the metal ion battery and is operable to cause a direct flow of power from the one or more photovoltaic cells to the electrolyser when the power storage level is above a threshold level.

10. The integrated solar hydrogen production module of claim 1, further comprising a solar thermal heater arranged to heat water held in or flowing into the electrolyser.

11. The integrated solar hydrogen production module of claim 1, further comprising an electric heater powered by the one or more photovoltaic cells or the energy storage system and arranged to heat water held in or flowing into the electrolyser.

12. The integrated solar hydrogen production module of claim 1, further comprising a pump arranged to pressurise water in the electrolyser.

13. The integrated solar hydrogen production module of claim 12, wherein the pump is arranged to pressurise the water to produce gaseous hydrogen at a pressure (a) of at least 2 barg, or (b) at least 10 barg, or (c) in the order of 40 barg.

14. The integrated solar hydrogen production module of claim 1, wherein the energy storage system is configured to provide a maximum output voltage of less than (a) 100 VDC, or (b) 50 VDC.

15. The integrated solar hydrogen production module of claim 1, wherein the one or more photovoltaic cells cover a surface area equal to at least 10% of the total surface area of the module.

16. The integrated solar hydrogen production module of claim 1, wherein the module is in the configuration of a rectangular prism having a top surface, four side surfaces and a bottom surface and wherein the one or more photovoltaic cells cover (a) at least 50% of the top surface; or (b) a portion of at least the top surface and a portion of at least one of the four side surfaces.

17. The integrated solar hydrogen production module of claim 1, further comprising one or more pitched surfaces and the one or more photovoltaic cells cover at least a portion of at least one of the pitched surfaces.

18. The integrated solar hydrogen production module of claim 1, wherein the electrolyser is formed without a membrane or separator and wherein hydrogen and oxygen produced by the electrolyser exits as a mixture of hydrogen and oxygen.

19. The integrated solar hydrogen production module of claim 18, further comprising an oxygen absorption material or system arranged to receive the mixture of hydrogen and oxygen external of the electrolyser wherein oxygen in the mixture is absorbed by the oxygen absorption material or system while hydrogen is able to flow downstream of the material or system.

20. The integrated solar hydrogen production module of claim 1, wherein the flow battery and the electrolyser both use a common electrolyte.

21. The integrated solar hydrogen production module of claim 20, wherein the common electrolyte is an alkaline.

22. The integrated solar hydrogen production module of claim 21, further comprising an electrolyte handling system arranged to provide the common electrolyte to the flow battery and the electrolyser.

23. The integrated solar hydrogen production module of claim 1, wherein the flow battery comprises first and second circuits for circulating respective liquids across the membrane, each circuit having a storage tank for the liquid and a pump; and wherein the first and second circuits are held within the module housing.

24. An integrated solar hydrogen production module comprising:

one or more photovoltaic cells supported on, or forming at least a portion of, an outer surface of the module;

an energy storage system comprising a rechargeable metal-ion battery and a flow battery having a membrane;

an electrolyser for converting water to gaseous hydrogen and oxygen and producing a mixed gas stream of hydrogen and oxygen that exits the electrolyser; and an oxygen absorption material or system to which the mixed gas stream is fed, the oxygen absorption material or system arranged to absorb oxygen from the mixture and allow a downstream flow of gaseous hydrogen;

wherein the one or more photovoltaic cells are arranged to at least provide charge to the metal-ion battery, and the flow battery is arranged to provide electricity directly to the electrolyser or indirectly to the electrolyser via the rechargeable metal-ion battery.

* * * * *